US007373269B2

(12) United States Patent
Furuichi et al.

(10) Patent No.: US 7,373,269 B2
(45) Date of Patent: May 13, 2008

(54) PROCESSOR POWER CONSUMPTION CONTROL

(75) Inventors: Sanehiro Furuichi, Kawasaki (JP); Susumu Shimotono, Hadano (JP)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 11/284,286

(22) Filed: Nov. 21, 2005

(65) Prior Publication Data

US 2006/0129881 A1 Jun. 15, 2006

(30) Foreign Application Priority Data

Nov. 19, 2004 (JP) .............. 2004-336388

(51) Int. Cl.
*G06F 1/32* (2006.01)
(52) U.S. Cl. ............... 702/132; 702/136; 702/186; 713/300; 713/320
(58) Field of Classification Search ........... 702/132, 702/136
See application file for complete search history.

(56) References Cited

U.S. PATENT DOCUMENTS 5,913,068 A * 6/1999 Matoba .............. 713/322
6,014,611 A * 1/2000 Arai et al. ............ 702/132
2004/0153786 A1* 8/2004 Johnson et al. ........ 714/25
2004/0215989 A1* 10/2004 Kawano et al. ....... 713/300

FOREIGN PATENT DOCUMENTS

| JP | 08-006681 | 1/1996 |
| JP | 09-305268 | 11/1997 |
| JP | 11-191016 | 7/1999 |
| JP | 2002-202893 | 7/2002 |

* cited by examiner

*Primary Examiner*—Hal Wachsman
(74) *Attorney, Agent, or Firm*—Louis P. Herzberg

(57) ABSTRACT

An information processing apparatus provides control of power consumption of multiple central processors. The apparatus includes, sections for: measuring temperature of each central processor; calculating halt percentage for each of the central processors from measured temperatures halt percentages and a particular thread executed in each of the central processors; transitioning to a wait state in which a central processor executes another thread during a predetermined wait period or a running state in which an internal halt instruction is executed causing the central processor to halt processing in accordance with the halt percentage; and interrupting each of the central processors and causing a central processor that is halting processing to resume processing.

18 Claims, 8 Drawing Sheets

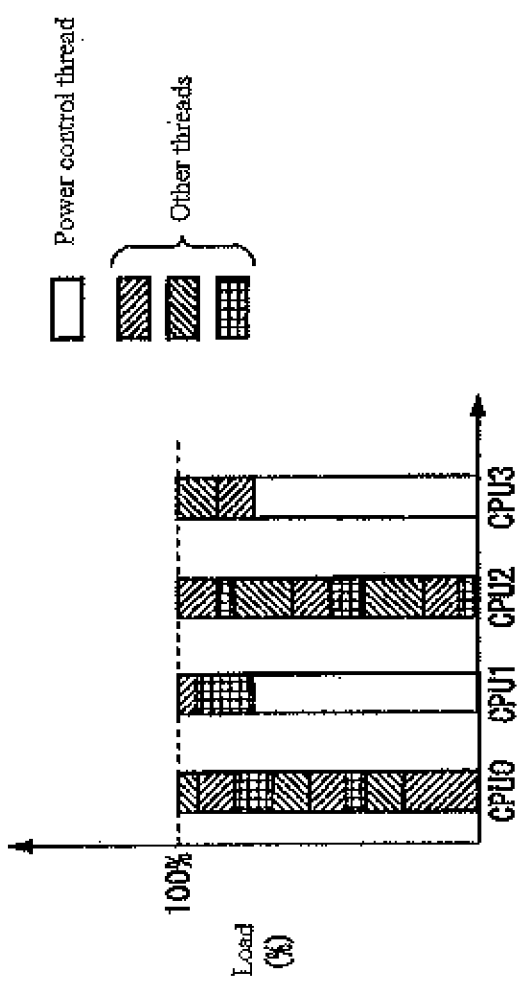
Fig. 7(b) Halt state is set
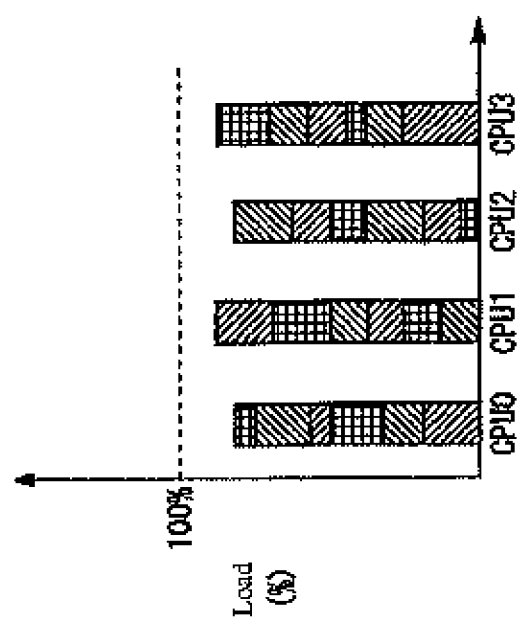
Fig. 7(a) Halt state is not set

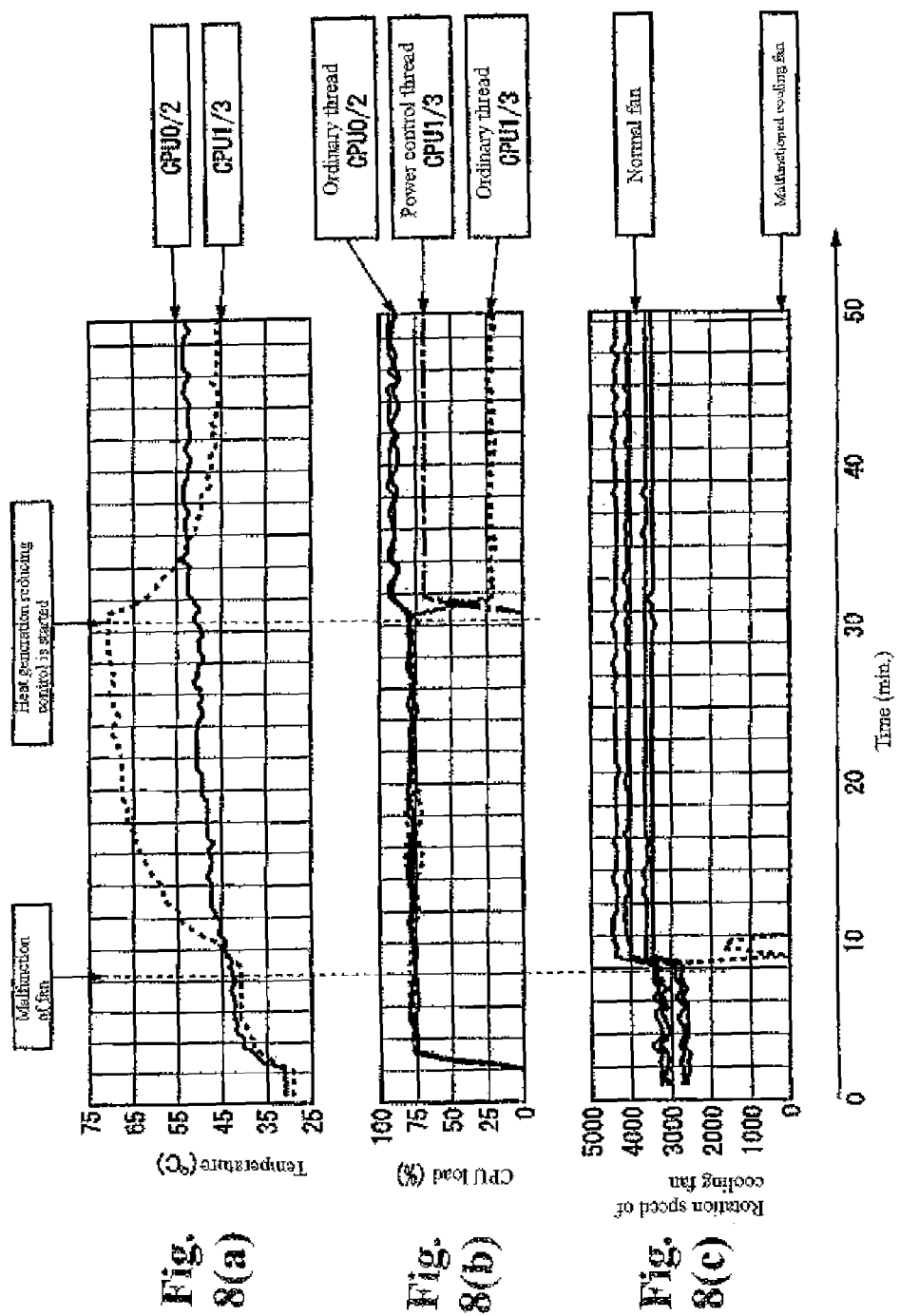

PROCESSOR POWER CONSUMPTION CONTROL

FIELD OF THE INVENTION

The present invention relates to an information processing apparatus, a control method, and a program and in particular to an information processing apparatus having multiple central processors and controlling the power consumption of the multiple central processors, and a control method and program therefor.

BACKGROUND ART

With the increase in the density and speed of processors, the power consumption in the processors have been significantly increased in recent years, and along with this, various problems due to heat generation by the processors have arisen. Especially in a high-end server in which multiple processors are densely integrated in the same housing, how to allow heat produced to efficiently be escaped is becoming a critical factor that determines the design of the system. For example, a large heat sink is provided or multiple cooling fans are operated in a system to remove heat. However, heat increase that cannot be suppressed is becoming an impediment to improvements in performance. Because a high availability is required of high-end servers, the systems are not allowed to be shut down. Therefore, a heat removing mechanism in which a malfunctioned cooling fan can be replaced while the system keeps operation is provided in some system. In other systems, a mechanism that increases the rotation speed of the other cooling fans to compensate for a loss of the heat removing capacity is employed if some of the cooling fans malfunction. In yet other systems, a mechanism is provided that decreases the operating frequency of all processors by an equal degree to prevent overheating of the entire servers if a certain processor overheats. Redundant heat removing mechanisms as described above are used to improve the availability of systems, notably high-end servers for which heat removing is an important issue. As a result, the costs of the servers have been significantly increased. Further, these redundant heat removing mechanisms have their limits. It is often the case if a number of cooling fans fail at a time, the remaining cooling fans cannot sufficiently remove heat and the temperature of processors increases to a hazardous temperature in a few minutes, resulting in emergency shutdown of the system.

Because of such imperfection, service personnel are stationed in an environment such as a mission-critical system in a company that is not allowed to go down, so that failed parts of the system can be immediately replaced, which leads to a further cost increase. Furthermore, such mechanisms are intended to prevent only hardware damage or system shutdown. Accordingly, they are not designed to maintain a high service throughput in case of hardware overheating.

The following documents are considered:
[Patent Document 1] Published Unexamined Patent Application No. 9-305268
[Patent Document 2] Published Unexamined Patent Application No. 11-191016
[Patent Document 3] Published Unexamined Patent Application No. 2002-202893
[Patent Document 4] Published Unexamined Patent Application No. 8-6681

Various techniques that control power consumption with higher precision have been proposed. In particular, dedicated hardware circuitry is provided in a processor unit that reduces the operating frequency of the processors to control power so as to keep their temperatures within a predetermined range when the temperature of the unit increases (see Patent Document 1). Another technique has been proposed in which processing by a processor cooled by a cooling fan is stopped if a malfunction of the cooling fan is detected (see Patent Document 2). Yet another proposed technique controls task scheduling for allocating tasks to processors in an asymmetrical multiprocessor system so as to maintain the power consumption in the entire system below a predetermined value (see Patent Document 3). Another proposed technique reduces the operating frequency of a processor if the processor is found to be in an idle state in which it is not performing a task (see Patent Document 4).

The following problems are solved by the present invention. Firstly, according to Patent Document 1, circuitry dedicated to power control must be provided in processors. Therefore, it is difficult to implement the technique in computers such as low-cost servers and personal computers that are made up of off-the-shelf components. According to Patent Document 2, when a malfunction of a cooling fan is detected, the processor cooled by the malfunctioned cooling fan is stopped even if the malfunction is a slight reduction in the rotation speed of the cooling fan. Consequently, the maximum performance of the processor that could be achieved by cooling the processor with the fan cannot be provided at the reduced rotation speed and therefore the performance of the overall computer is excessively reduced. The system described in Patent Document 3 performs task scheduling in order to reduce power consumption. Therefore, the system can degrade the performance, rather than increasing processing speed or reducing waiting time, which are purposes of typical task scheduling. The technique described in Patent Document 4 cannot reduce the operating frequency of an overheated processor unless an idle state of the processor is detected.

SUMMARY OF THE INVENTION

In light of these problems, and an aspect of the present invention is to provide power control using software without the need of using additional special hardware components, even when the temperature of a particular processor significantly increases due to a malfunction of a fan or the like.

Another aspect of the present invention is to provide a mechanism that controls power to a particular processor selectively while keeping a system servicing, without shutting down the system, thereby significantly increasing the availability of the system. The aspects can be achieved by a combination of features set forth in the independent claims. The dependent claims define further advantageous specific embodiments.

The present invention also provides an information processing apparatus having a plurality of central processors, and a control method for the information processing apparatus and a program for controlling the information processing apparatus.

An example of an information processing apparatus includes: a temperature measuring section for measuring the temperature of each of the plurality of central processors; a halt percentage calculating section for calculating a halt percentage for each of the central processors from the measured temperature of the central processor, the halt percentage being the percentage of time in which processing by the central processor is to be being halted to the time in which electric power is being supplied to at least a part of the central processor; a halt state control section implemented by a particular thread associated with each of the plurality of central processors and executed in the central processor, the halt state control section transitioning to a wait state in which the halt control section causes the central processor to execute another thread during predetermined wait period or a running state in which the halt control section executes an internal halt instruction to cause the central processor to halt processing, thereby causing the central processor to halt processing in accordance with the halt percentage; and an interrupting section for interrupting each of the plurality of central processors and causing a central processor that is halting processing to resume processing. The above summary of the invention does not enumerate all features needed for the present invention and a sub combination of the features may also provide an invention. Thus, according to the present invention, the power consumption of central processors can be controlled more flexibly than ever before.

BRIEF DESCRIPTION OF THE DRAWINGS

FIGS. 7(a) and 7(b) show differences in load on central processors between a situation where a halt state is not set and a situation where a halt state is set;
and
FIGS. 8(a), 8(b) and 8(c) show changes in temperature and load of central processors and changes in the rotation speed of cooling fans of the information processing unit 10.

DESCRIPTION OF SYMBOLS

Figure 1:
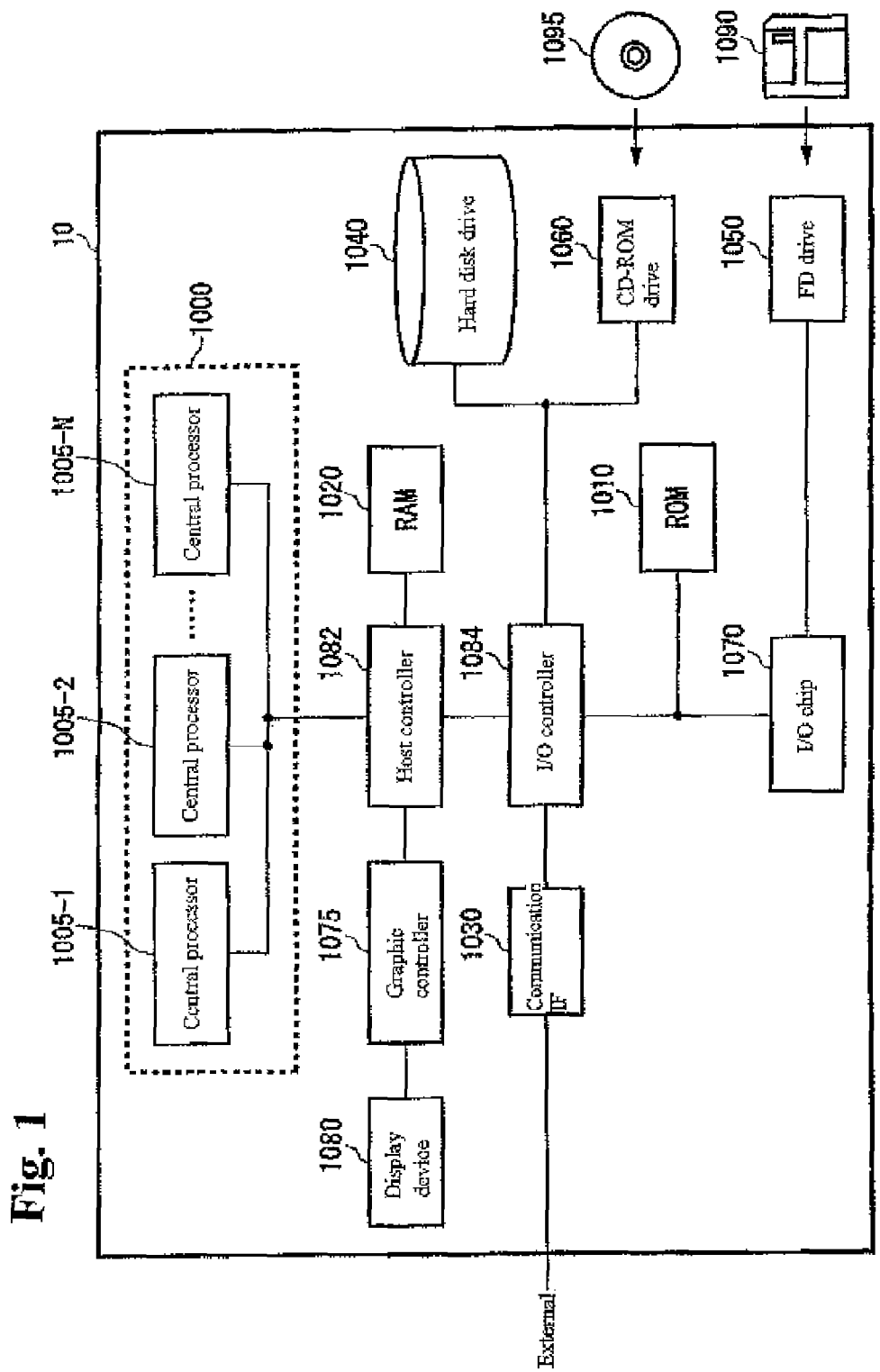
FIG. 1 shows an internal configuration of an information processing apparatus 10.

11 . . . Information processing apparatus
20 . . . Temperature monitoring thread
22 . . . Power control thread
24 . . . Activating thread
200 . . . Temperature measuring section
210 . . . Halt percentage calculating section
220 . . . Halt state control section 230 . . . Interrupting section
400 . . . Interrupting section
1000 . . . Central processor unit
1005 . . . Central processor
1010 . . . ROM
1020 . . . RAM
1084 . . . Input/Output controller

DETAILED DESCRIPTION OF THE INVENTION

The present invention provides information processing apparatus having a plurality of central processors, control methods for the information processing apparatus, and programs for controlling the information processing apparatus. In an example embodiment, an information processing apparatus includes: a temperature measuring section for measuring the temperature of each of the plurality of central processors; a halt percentage calculating section for calculating a halt percentage for each of the central processors from the measured temperature of the central processor, the halt percentage being the percentage of time in which processing by the central processor is to be being halted to the time in which electric power is being supplied to at least a part of the central processor; a halt state control section implemented by a particular thread associated with each of the plurality of central processors and executed in the central processor, the halt state control section transitioning to a wait state in which the halt control section causes the central processor to execute another thread during predetermined wait period or a running state in which the halt control section executes an internal halt instruction to cause the central processor to halt processing, thereby causing the central processor to halt processing in accordance with the halt percentage; and an interrupting section for interrupting each of the plurality of central processors and causing a central processor that is halting processing to resume processing. The above summary of the invention does not enumerate all features needed for the present invention and a sub combination of the features may also provide an invention. Thus, according to the present invention, the power consumption of central processors can be controlled more flexibly than ever before.

Thus, the present invention provides a solution to problems with the methods of Patent Document 1 and Patent Document 2. According to Patent Document 1, circuitry dedicated to power control must be provided in processors. Therefore, it is difficult to implement the technique in computers such as low-cost servers and personal computers that are made up of off-the-shelf components. According to Patent Document 2, when a malfunction of a cooling fan is detected, the processor cooled by the malfunctioned cooling fan is stopped even if the malfunction is a slight reduction in the rotation speed of the cooling fan. Consequently, the maximum performance of the processor that could be achieved by cooling the processor with the fan cannot be provided at the reduced rotation speed and therefore the performance of the overall computer is excessively reduced. The system described in Patent Document 3 performs task scheduling in order to reduce power consumption. Therefore, the system can degrade the performance, rather than increasing processing speed or reducing waiting time, which are purposes of typical task scheduling. The technique described in Patent Document 4 cannot reduce the operating frequency of an overheated processor unless an idle state of the processor is detected.

While the present invention is further described below with respect to embodiments thereof, the embodiments are not intended to limit the present invention, and not all of the combinations of features described in the embodiments are essential to the inventive solution.

FIG. 1 shows an internal configuration of an information processing apparatus 10. The information processing apparatus 10 includes a central processing section including a central processor unit 1000, a RAM 1020, and a graphic controller 1075 which are interconnected through a host controller 1082. The information processing apparatus 10 also includes an input/output section including a communication interface 1030, a hard disk drive 1040, and a CD-ROM drive 1060 which are connected to the host controller 1082 through the input/output controller 1084. The information processing apparatus 10 also includes a legacy input/output section including a ROM 1010, a flexible disk drive 1050, and an input/output chip 1070 which are connected to the input/output controller 1084. The host controller 1082 connects the RAM 1020 with central processors 1005-1 and the graphic controller 1075, which access the RAM 1020 at higher transfer rates. The central processor unit 1000 includes multiple central processors, for example, central processors 1005-1-1005-N. The central processor 1005-1 operates according to programs stored in the ROM 1010 and the RAM 1020 to control components of the apparatus. The central processor 1005-1 is almost the same as each of the central processors 1005-2-1005-N. The central processors access the RAM 1020 at almost the same access rate. That is, the information processing apparatus 10 includes symmetric multiprocessors (SMPs). Because the central processors 1005-2-1005-N are the almost same as the central processor 1005-1, the description of the central processors 1005-2-1005-N will be omitted, except for differences. The graphic controller 1075 obtains image data generated by the central processor 1005-1 or the like on a frame buffer provided in the RAM 1020 and causes it to be displayed on a display device 1080. Alternatively, the graphic controller 1075 may contain a frame buffer for storing image data generated by the central processor 1005-1 or the like. The input/output controller 1084 connects the host controller 1082 with the communication interface 1030, the hard disk drive 1040, and the CD-ROM drive 1060, which are relatively fast input/output devices. The communication interface 1030 communicates with external devices through a network. The hard disk drive 1040 stores programs and data used by the information processing apparatus 10. The CD-ROM drive 1060 reads a program or data from a CD-ROM 1095 and provides it to the input/output chip 1070 through the RAM 1020.

Connected to the input/output controller 1084 are ROM 1010 and relatively slow input/output devices such as the flexible disk drive 1050, and the input/output chip 1070. The ROM 1010 stores a boot program executed by the central processor 1005-1 during boot-up of the information processing apparatus 10 and programs dependent on the hardware of information processing apparatus 10. The flexible-disk drive 1050 reads a program or data from a flexible disk 1090 and provides it to the input/output chip 1070 through the RAM 1020. The input/output chip 1070 connects the flexible disk 1090, and various input/output devices through ports such as a parallel port, serial port, keyboard port, and mouse port, for example.

A program to be provided to the information processing apparatus 10 is stored on a recording medium such as a flexible disk 1090, a CD-ROM 1095, or an IC card and provided by a user. The program is read from the recording medium and installed in the information processing apparatus 10 through the input/output chip 1070 and/or input/output controller 1084 and executed. Operations performed by the information processing apparatus 10 under the control of the program will be described later with reference to FIGS. 2 to 8. The program mentioned above may be stored in an external storage medium. The storage medium may be a flexible disk 1090 or a CD-ROM 1095, or an optical recording medium such as a DVD and PD, a magneto-optical recording medium such as an MD, a tape medium, or a semiconductor memory such as an IC card. Alternatively, a storage device such as a hard disk or a RAM provided in a server system connected to a private communication network or the Internet may be used as the recording medium and the program may be provided from the storage device to the information processing apparatus 10 over the network.

Figure 2:
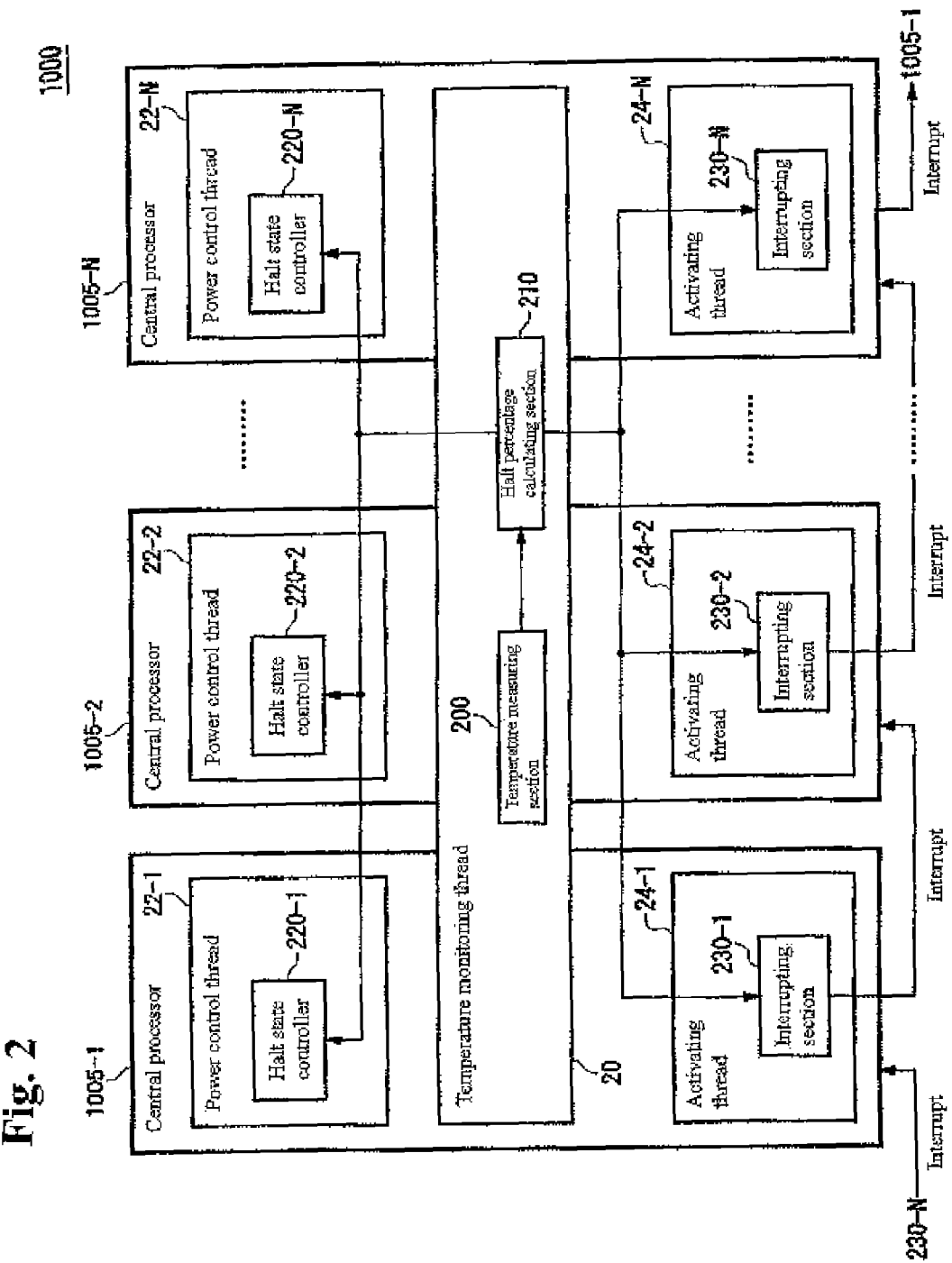
FIG. 2 shows functions of a power control program executed by a central processor unit 1000 as functional blocks.

FIG. 2 shows functions of the program executed in the central processor unit 1000 as functional blocks. As described above, the central processor unit 1000 includes the central processors 1005-1-1005-N. Any of the central processor 1005-1-1005-N executes a temperature monitoring thread 20. The temperature monitoring thread 20 functions as a temperature measuring section 200 and a halt percentage calculating section 210. The temperature measuring section 200 measures the temperature of each of the central processors 1005-1-1005-N.

The temperature measuring section 200 uses a temperature sensor provided in advance in the central processor 1005-1-1005-N to measure temperature. Alternatively, the temperature measuring section 200 may measure power consumed by each of the central processors 1005-1-1005-N to calculate an estimated temperature based on the power consumption to determine the temperature. The halt percentage calculating section 210 calculates, on the basis of the measured temperature of each of the central processors 1005-1-1005-N, a halt percentage, which is a percentage of the time during which the processing by the central processor is being halted to the time during which power is supplied to at least a part of the central processor, for each of the central processor 1005-1-1005-N. The central processor 1005-1 executes a power control thread 22-1 and an activating thread 24-1. The power control thread 22-1 is a particular thread associated with the central processor 1005-1 and executed on the central processor 1005-1. In particular, the power control thread 22-1 is a thread for which processor affinity is set in a thread scheduler of an operating system so that the thread is executed on central processor 1005-1. The power control thread 22-1 is executed by the central processor 1005-1 at higher priority level than the other threads that execute application programs. A setting that causes the power control thread 22-1 to be scheduled at hither priority level than the other threads may be set in the operating system. Alternatively, the operating system may be provided with the function of scheduling the power control thread 22-1 at hither priority level than the other threads. The halt state control section 220-1 is implemented by the power control thread 22-1. The halt state control section 220-1 transitions to a wait state in which it allows the central processor 1005-1 to execute another thread for a predetermined period of time or a running state in which an internal halt instruction to cause the central processor 1005-1 to halt processing is executed.

The halt state control section 220-1 controls the percentages of wait-state time and running-state time to halt the processing by the central processor 1005-1 in accordance with the halt percentage calculated by the halt percentage calculating section 210. The activating thread 24-1 functions as an interrupting section 230-1. The interrupting section 230-1 is associated with central processor 1005-2 and implemented by a thread executed by another central processor, that is, activating thread 24-1. The interrupting section 230-1 issues an interrupt to the central processor 1005-2 at regular intervals to cause the central processor 1005-2 that suspends processing to resume the processing.

Similarly, central processor 1005-2 functions as an interrupting section 230-2 and issues an interrupt to the central processor 1005-3. The central processor 1005-N functions as an interrupting section 230-N, which issues an interrupt to the central processor 1005-1.

Figure 3:
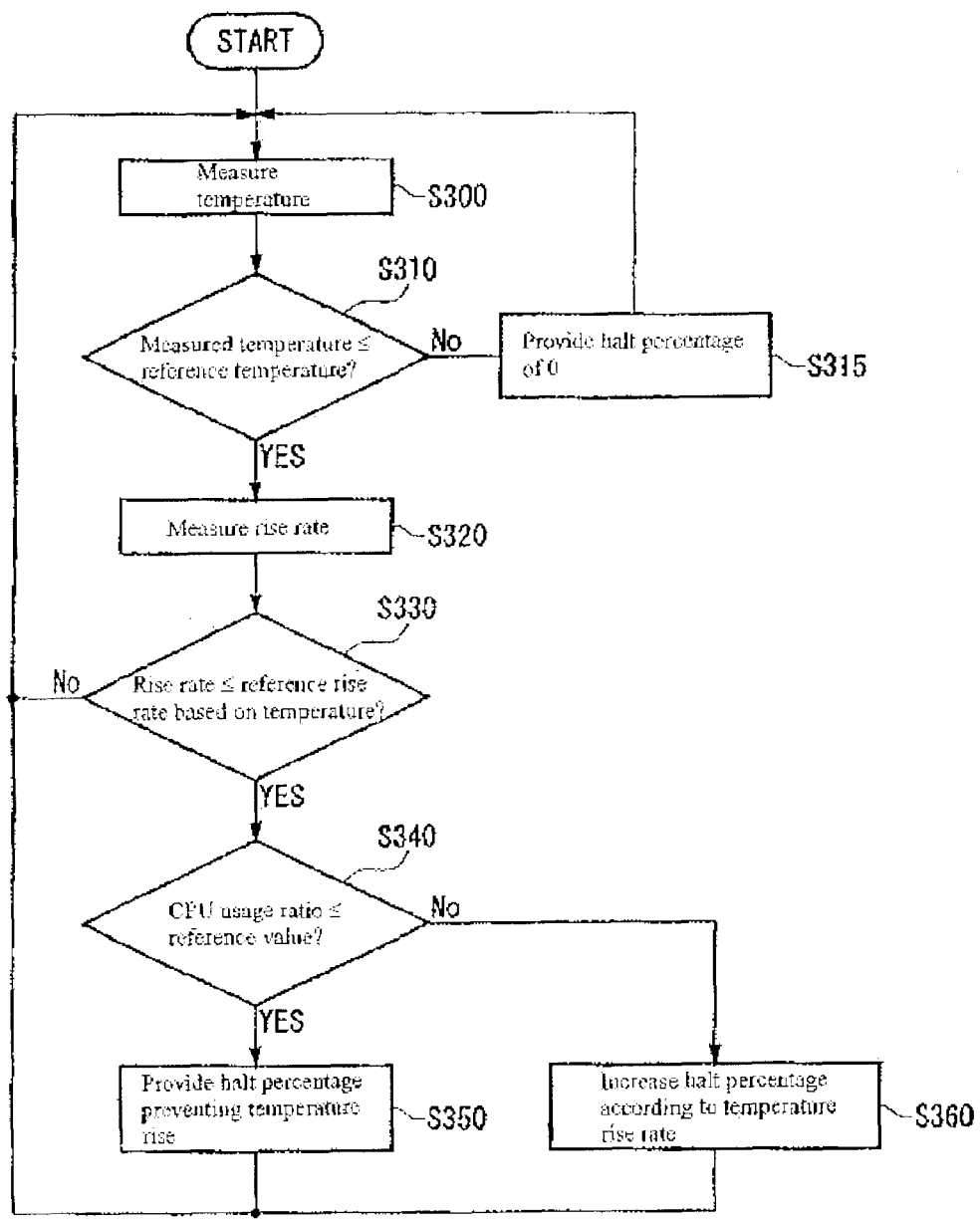
FIG. 3 is a flowchart illustrating an example of a process performed by a halt percentage calculating section 210 for calculating a halt percentage.

FIG. 3 is a flowchart of an example of a process for the halt percentage calculating section 210 to calculate the percentage of a halt. The temperature measuring section 200 and the halt percentage calculating section 210 perform the process for each of the central processor. FIG. 3 shows an example of the process which is performed by the temperature measuring section 200 and the halt percentage calculating section 210 for central processor 1005-1. First, the temperature measuring section 200 measures the temperature of the central processor 1005-1 (S300). The halt percentage calculating section 210 determines whether the measured temperature is higher than or equal to a predetermined reference temperature (S310). If the measured temperature is less than the reference temperature (S310: NO), the halt percentage calculating section 210 provides a halt percentage of 0% (S315) and returns to S300.

On the other hand, if the measured temperature is higher than or equal to the reference temperature (S310: YES), the halt percentage calculating section 210 measures the rate of the increase of temperature (S320). For example, the halt percentage calculating section 210 may calculate the difference between the previously measured temperature and the current measured temperature and divide the difference by the time interval between the measuring times. Then, the halt percentage calculating section 210 determines whether the rate of rise of the temperature of the central processor 1005-1 is greater than a reference rise rate based on the temperature of central processor 1005-1 (S330). If the rate of rise of the temperature of the central processor 1005-1 is greater than the reference rise rate (S330: NO), the process returns to S300. The reference rise rate is predetermined according to temperature. For example, the rate takes a lower value as the temperature rises and a higher value as the temperature falls. On the other hand, if the rate of rise of the temperature of the central processor 1005-1 is greater than the reference rise rate (S330: YES), the halt percentage calculating section 210 determines whether the CPU usage ratio of the central processor 1005-1 is greater than or equal to a reference value (S340). If the CPU usage ratio is greater than or equal to the reference value (S340: YES), the halt percentage calculating section 210 provides a higher halt percentage than the previous percentage calculated in order to provide a halt percentage to prevent a rise in the temperature of central processor 1005-1 (S350). For example the halt percentage calculating section 210 may increment the halt percentage by 1%. On the other hand, if the CPU usage ratio is less than the reference value (S340: NO), the halt percentage calculating section 210 provides an increment by which the halt percentage is increased in accordance with the rate of increase of the temperature (S360). For example, the halt percentage calculating section 210 may provide a greater increment at a higher temperature rise rate than an increment at a lower temperature rise rate. The halt percentage calculating section 210 adds the calculated increment to the previously calculated halt percentage. The temperature measuring section 200 and the halt percentage calculating section 210 return to step S300.

In this way, the halt percentage calculating section 210 set a halt percentage greater than 0 for central processor 1005-1 if the temperature of central processor 1005-1 rises to a value greater than the reference temperature. If the central processor is halted according to the previously calculated halt percentage and its temperature still rises, the halt percentage calculating section 210 calculates a halt percentage greater than the previously calculated halt percentage. Thus, processing in the central processor 1005-1 can be halted for an appropriate amount of time to decrease the temperature of central processor 1005-1. The halt percentage calculating section 210 also determines on the basis of the CPU usage ratio whether a task being executed by central processor 1005-1 requires a throughput beyond a predetermined reference throughput. If it is beyond the reference throughput, then the halt percentage calculating section 210 calculates a halt percentage that does not increase nor decrease the temperature of central processor 1005-1 so that the execution of the task is completed. In this way, the halt percentage can be determined flexibly according to the temperature of the central processor 1005-1 as well as the execution state of a task.

Figure 4:
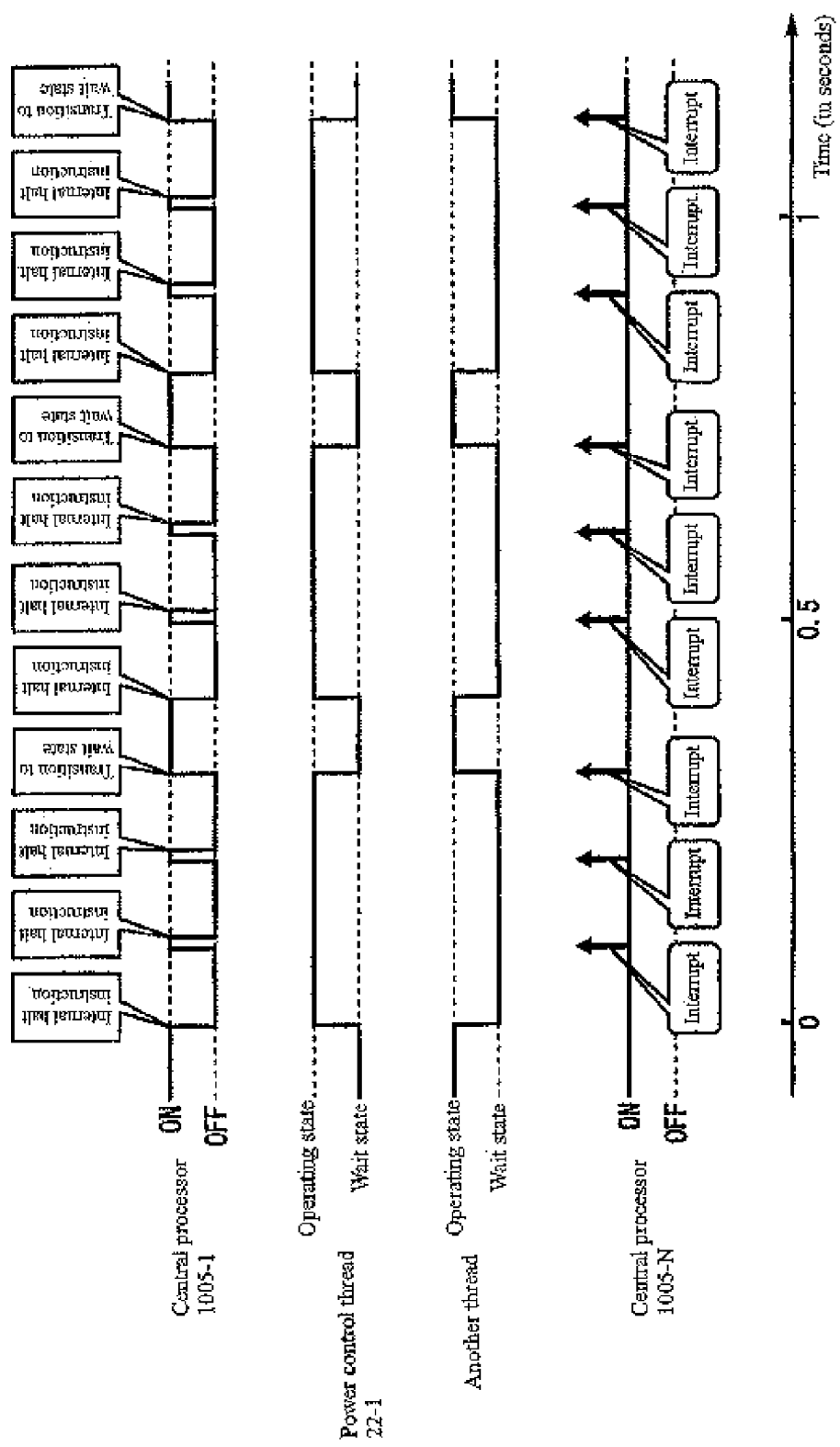
FIG. 4 is a timing chart showing changes of state of a central processor 1005-1.

FIG. 4 is a timing chart showing changes of the state of central processor 1005-1. Shown in the chart are changes of the state of the central processor 1005-1, changes of the state of the power control thread 22-1, changes of the state of other threads running on central processor 1005-1, and changes of state of central processor 1005-N, from the top of the chart. Referring to FIG. 4, changes of the states that occur when the halt percentage calculating section 210 calculated a halt percentage of 75% for central processor 1005-1.

The power control thread 22-1 changes to the running state if the halt percentage of central processor 1005-1 is set to a value greater than 0. The halt state control section 220-1 executes an internal halt instruction immediately after the power control thread 22-1 changes to the running state. This causes central processor 1005-1 to change to the halt state (the OFF state) in which it halts processing. The internal halt instruction is a HALT instruction that causes the computing unit of central processor 1005-1 to halt processing while keeping the operating clock of central processor 1005-1 active. The internal halt instruction includes a voltage reduction instruction that is executed prior to a HALT instruction to reduce the operating voltage of central processor 1005-1. Then, the interrupting section 230-N issues an interrupt to central processor 1005-1 at regular intervals to cause it to resume halted processing (the ON state). After central processor 1005-1 resumes processing, the halt state control section 220-1 resumes its operation and immediately executes the internal halt instruction. This causes central processor 1005-1 to enter a halt state again. Then, the halt state control section 220-1 receives a second interrupt and resumes its operation and executes the internal halt instruction. Then, the central processor 1005-1 changes to a halt state.

When central processor 1005-1 resume processing in response to a third interrupt from the interrupting section 230-N, the halt state control section 220-1 is caused to enter a wait state by a wait transition process and causes central processor 1005-1 to execute another thread. As a result, the other thread changes from a wait state to a running state. The wait transition process may be a sleep system call which places a thread in a wait sate for a predetermined wait period and then causes the thread to run. As a result, the other thread runs on central processor 1005-1.

After the wait period elapses, the power control thread 22-1 changes to a running state. This causes the other thread running on central processor 1005-1 to enter in a wait state. Immediately after these state transitions, the halt state control section 220-1 executes an internal halt instruction to cause central processor 1005-1 to enter a halt state again. The halt state control section 220-1 subsequently performs the wait transition process every four activations in a similar manner. Consequently, central processor 1005-1 can be in a halt (OFF) state in which it halts processing for approximately three fourths of the operating time of central processor 1005-1.

As shown in FIG. 4, each time central processor 1005-1 which runs the halt state control section 2201 receives an interrupt, the halt state control section 220-1 can determine, according to the halt percentage, whether to execute another thread and then to a running state to execute an internal halt instruction by entering a wait state, or to execute an internal halt instruction without entering a wait state by entering a running state.

Alternatively, the halt state control section 220-1 may change to a wait state and stay in the wait sate for a period determined in accordance with the halt percentage calculated by the halt percentage calculating section 210, each time central processor 1005-1 receives an interrupt. In that case, the halt state control section 220-1 changes to a running state in which an internal halt instruction is executed after a wait period elapses. For example, if central processor 1005-1 receives an interruption every 100 ms, the halt state control section 220-1 may enter and stay in a wait state for 25 ms at every interrupt. This control also can halt central processor 1005-1 at a moderate ratio to prevent damage or malfunctions.

As shown in FIGS. 1 to 4, the information processing apparatus 10 in the present embodiment can flexibly control the halt percentage of central processors by using software. In particular, the power control thread, the temperature monitoring thread, and the activating thread, which run on the operating system, cooperate to control the halt percentage. This can prevent overheating of central processors while maintaining the performance of the central processors at the maximum allowable level, without any additional large-scale cooling mechanism such as a cooling fan or heat sink. Furthermore, the halt state is controlled by a user-level thread running under the control of an operating system. Threads are associated with central processors by processor affinity, which is a function of an existing operating system. Thus, according to the present embodiment, the halt state can be controlled without modifying or altering an existing operating system. With this control, a power control function can be added to enhance the power control of an existing information processing apparatus to ensure more efficient and stable operation of the information processing apparatus.

Figure 5:
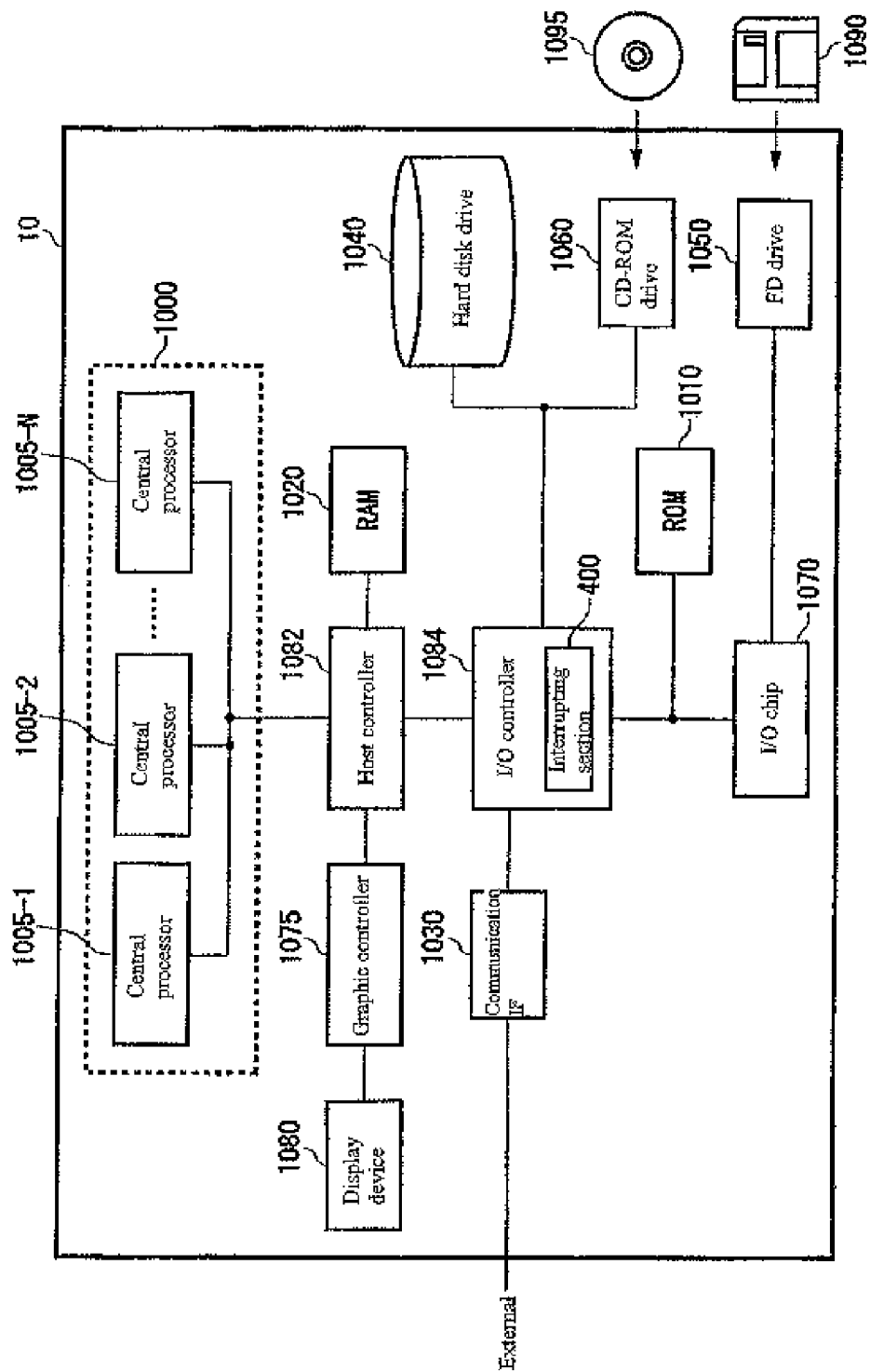
FIG. 5 shows an internal configuration of an information processing apparatus 10 according to a variation of the present embodiment.

FIG. 5 shows an internal configuration of an information processing apparatus 10 according to a variation of the present embodiment. Unlike the input/output controller 1084 shown in FIG. 1, the input/output controller 1084 in this example further includes an interrupting section 400. The interrupting section 400 provides an interval timer interrupt to each of central processors 1005-1-1005-N to cause a central processor in a halt state to resume processing. The interrupting section 400 may be implemented by a programmable interrupt controller provided in the input/output controller 1084.

Figure 6:
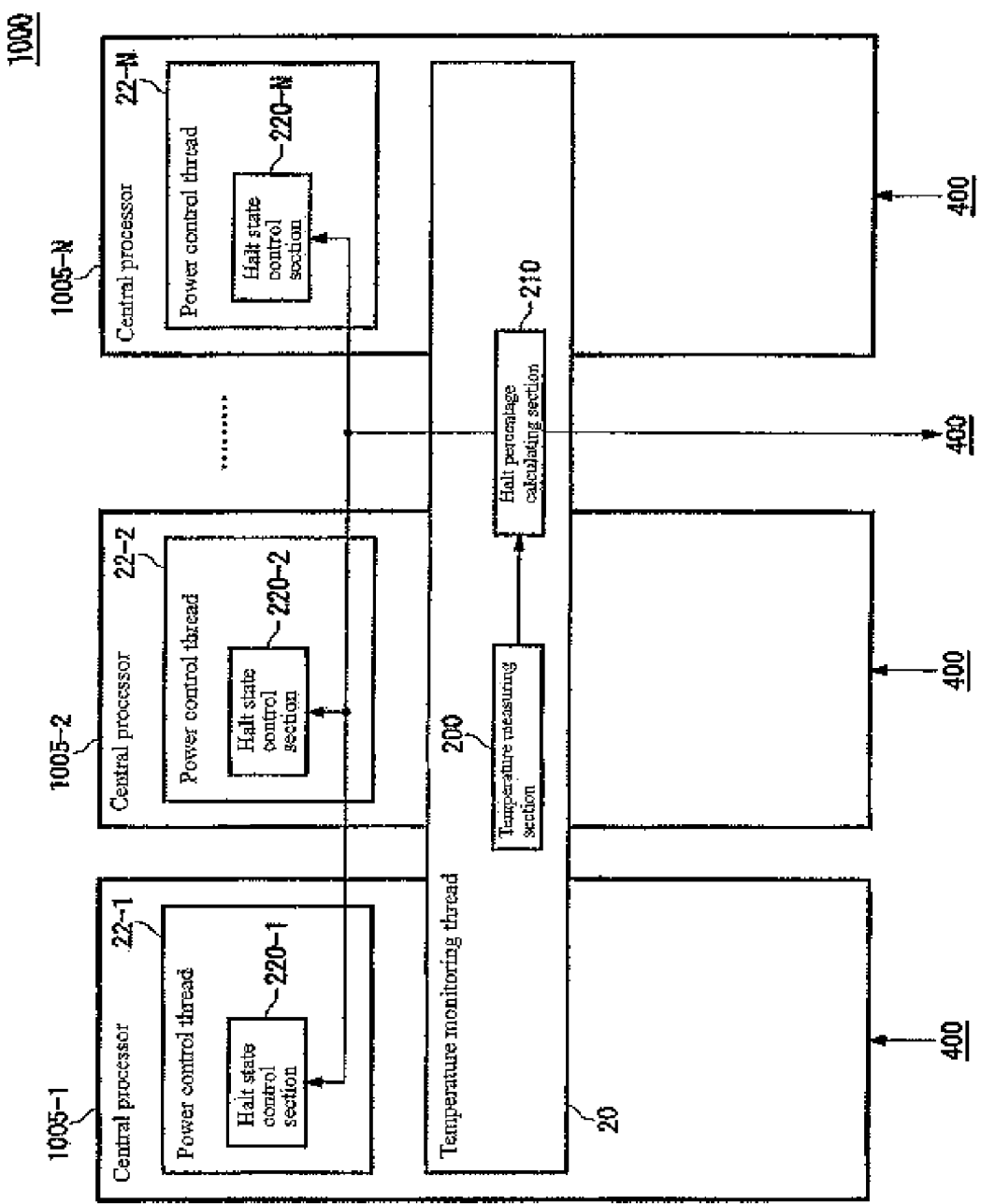
FIG. 6 shows functions of a power control program executed by a central processor unit 1000 according to a variation of the present embodiment as functional units.

FIG. 6 shows functions of the program executed in the central processor unit 1000 as functional blocks in a variation of the present embodiment. Unlike the central processor 1005-1 shown in FIG. 2, the central processor 1005-1 in this example does not necessarily need to execute an activating thread 24-1. That is, the central processor 1005-1 does not need to function as interrupting section 230-1. The halt percentage calculating section 210 in this example requests the interrupting section 400 to issue an interrupt to any of the central processors if the interrupt percentage calculating section 210 calculates a halt percentage greater than 0 for the central processor. Any of the central processors 1005-1-1005-N that is in a halt state resumes processing in response to an interrupt from the interrupting section 400. In this variation, the interrupt controller, instead of an activating thread, issues an interrupt to any of the central processors 1005-1-1005-N. This can reduce the number of threads running on the central processors and accordingly can allow another thread that executes a user application, for example, to be executed efficiently. Like the embodiment described above, this variation can flexibly control the halt percentage of central processors by using a user-level thread. That is, because the halt percentage of the central processor is controlled by the activating thread alone, complicated settings in the programmable interrupt controller are not required.

FIG. 7 shows the difference in load on a central processor between a situation where a halt state is not set and a situation where a halt state is set. In the example shown in FIG. 7, the information processing apparatus 10 includes four central processors (CPU 0 to CPU 3). It is also assumed here that the cooling capacity of a cooling fan for CPU 1 and CPU 3 decreases due to its malfunction, for example. Graph (a) shows actual measurements of load on the central processors in a situation before the cooling fan malfunctions and therefore a halt percentage is not set. A number of threads other than a power control thread are running on each of the central processors.

Graph (b) shows actual measurements of load on the central processors in a situation where a halt percentage is set for CPU 1 and CPU 3 as a result of a malfunction of the cooling fan. The load placed on CPU 1 and CPU 3 by the power control threads reaches approximately 75%. While the power control thread has control of the central processors, then central processors are placed in a halt state and halt processing. Therefore, it has been shown that actual load on CPU 1 and CPU 3 can be significantly reduced and overheating of CPU 1 and CPU 3 can be prevented despite of the malfunction of the cooling fan.

FIG. 8 shows changes in temperature and load of central processors as well as changes in the rotation speed of the cooling fan. As in the example in FIG. 7, the information processing apparatus 10 in the example shown in FIG. 8 includes four central processors (CPU 0 to CPU 3). It is also assumed that the cooling capacity of a cooling fan for CPU 1 and CPU 3 decreases due to its malfunction, 8 minutes after an experiment is started for example (Part (c) of FIG. 8). As a result, the temperature of CPU 1 and CPU 3 gradually increases and exceeds a reference temperature of 72° C. 28 minutes after the experiment is started (Part (a) of FIG. 8).

In response to this, the halt percentage calculating section 210 calculates a halt percentage of 75% for CPU 1 and CPU 3. Then, the power control thread 22-1 repeatedly switches between a wait state and a running state according to the halt percentage. As a result, the CPU load on CPU 1 and CPU 3 placed by the power control thread increased and the loads placed by the other threads decreased as shown in Part (b) of FIG. 8. Consequently, it has been shown that the temperature of CPU 1 and CPU 3 gradually decreases and stabilizes at a safe temperate 50 minutes after the experiment is started. (Part (a) of FIG. 8)

While the present invention has been described with respect to embodiments thereof, the technical scope of the present invention is not limited to that described with the embodiments. It will be apparent to those skilled in the art that various modifications or improvements can be made to the embodiment. It will be apparent from the claims that embodiments to which such modifications and improvements are made also fall within the scope of the technical scope of the present invention.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied there in for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied there in for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. An information processing apparatus having a plurality of central processors, comprising:
   a temperature measuring section for measuring the temperature of each central processor of the plurality of central processors;
   a halt percentage calculating section for calculating a halt percentage for said each central processor from the measured temperature of said each central processor, the halt percentage being a percentage of time in which processing by said each central processor is to be halted to the time in which electric power is being supplied to at least a part of said each central processor;
   a halt state control section implemented by a particular thread associated with said each central processor and executed in said each central processor, the halt state control section transitioning to a wait state in which the halt state control section causes said each central processor to execute another thread during a predetermined wait period or a running state in which the halt state control section executes an internal halt instruction to cause said each central processor to halt processing, thereby causing said each central processor to halt processing in accordance with the halt percentage; and
   an interrupting section for interrupting said each central processor and causing any central processor that is halting processing to resume processing.

2. The information processing apparatus according to claim 1, wherein each time the central processor which runs the halt state control section receives the interrupt, the halt state control section determines, according to the halt percentage, whether to execute another thread and then to enter a running state to execute an internal halt instruction by entering the wait state, or to execute an internal halt instruction without entering the wait state by entering the running state.

3. The information processing apparatus according to claim 2, wherein the halt state control section is implemented by a thread executed by the central processor at a higher priority level than other threads that execute application programs.

4. The information processing apparatus according to claim 2, wherein the halt state control section is provided in association with said each central processor and is implemented by a thread for which processor affinity is set in a thread scheduler of an operating system so that the thread is executed on said each central processor.

5. The information processing apparatus according to claim 1, wherein the interrupting section provides an interval timer interrupt to each of the plurality of central processors to cause a central processor in a halt state to resume processing.

6. The information processing apparatus according to claim 1, wherein the interrupting section is provided in association with said each central processor, is implemented by a thread to be executed on one of the central processors that is different from said each central processor and issues an interrupt to the central processors to cause a central processor in a halt state to resume processing.

7. The information processing apparatus according to claim 1, wherein:

the temperature measuring section measures the rate of increase of the temperature of each of the central processors; and the halt percentage calculating section calculates a halt percentage that decreases the temperature of any of the central processors when the temperature of said each central processor is higher than or equal to a predetermined reference and the temperature of said each central processor has increased, on the basis of the rate of the increase of the temperature for said each central processor.

8. The information processing apparatus according to claim 7, wherein the halt percentage calculating section calculates a halt percentage greater than a previously calculated halt percentage if a particular central processor has been halted with the previously calculated halt percentage and the temperature of said particular central processor has increased.

9. The information processing apparatus according to claim 7, wherein the halt percentage calculating section calculates a halt percentage that does not increase the temperature of any of the central processors if a task being executed on the central processor requires a throughput beyond a predetermined reference throughput.

10. The information processing apparatus according to claim 1, wherein the halt state control section transitions to and stays in the wait state for a wait period which is determined according to the halt percentage each time a central processor executing the halt state control section receives the interrupt, and after the lapse of the wait period, transitions to the running state in which the internal halt instruction is executed.

11. The information processing apparatus according to claim 1, wherein the interrupting section is provided in association with said each central processor, is implemented by a thread to be executed on one of the central processors that is different from said each central processor and issues an interrupt to the central processors to cause a central processor in a halt state to resume processing;

wherein the temperature measuring section measures the rate of increase of the temperature of each of the central processors; and the halt percentage calculating section calculates a halt percentage that decreases the temperature of any of the central processors when the temperature of said each central processor is higher than or equal to a predetermined reference and the temperature of said each central processor has increased, on the basis of the rate of the increase of the temperature for said each central processor;

wherein the halt percentage calculating section calculates a halt percentage greater than a previously calculated halt percentage if a particular central processor has been halted with the previously calculated halt percentage and the temperature of said particular central processor has increased; and wherein the halt percentage calculating section calculates a halt percentage that does not increase the temperature of any of the central processors if a task being executed on the central processor requires a throughput beyond a predetermined reference throughput.

12. A control method, in an information processing apparatus having a plurality of central processors, for controlling the power consumption of the plurality of central processors, the method comprising:

a temperature measuring step of measuring the temperature of each central processor of the plurality of central processors;

a halt percentage calculating step of calculating a halt percentage for each of the plurality of central processors from the measured temperature of said each central processor, the halt percentage being the percentage of time in which processing by said each central processor is to be halted to the time in which electric power is being supplied to at least a part of said each central processor;

a halt state control step, implemented by a particular thread associated with each of the plurality of central processors and executed in the central processor, of transitioning to a wait state in which a halt state control section causes the central processor to execute another thread during predetermined wait period or a running state in which the halt state control section executes an internal halt instruction to cause said each central processor to halt processing, thereby causing said each central processor to halt processing in accordance with the halt percentage; and an interrupting step of interrupting each of the plurality of central processors and causing a central processor that is halting processing to resume processing.

13. The control method according to claim 12, wherein each time the particular thread which runs the halt state control section receives an interrupt, the halt state control section determines, according to the halt percentage, whether to execute another thread and then to enter a running state to execute an internal halt instruction by entering the wait state, or to execute an internal halt instruction without entering the wait state by entering a running state.

14. The control method according to claim 13, wherein the halt state control section is provided in association with said each central processor and is implemented by a different thread for which processor affinity is set in a thread scheduler of an operating system so that the different thread is executed on said each central processor.

15. The control method according to claim 12, wherein the halt state control section is implemented by the particular thread executed by the central processor at a higher priority level than other threads that execute application programs.

16. An article of manufacture comprising a computer readable medium having computer readable program code embodied therein for causing control in an information processing apparatus having a plurality of central processors, the computer readable program code comprising program code for causing a computer to effect the steps of claim 12.

17. A program storage device readable by machine, tangibly embodying program code executable by the machine to perform method steps comprising the steps of claim 12.

18. A computer program product comprising a computer readable medium having computer readable program code embodied therein for causing functions of an information processing apparatus having a plurality of central processors, the computer readable program code comprising program code for causing a computer to effect the functions of claim 1.

* * * * *